United States Patent [19]

Schoon

[11] Patent Number: 5,481,398

[45] Date of Patent: Jan. 2, 1996

[54] TEMPERATURE STABILIZATION MEANS FOR IMAGING OUTPUT RECORDER

[75] Inventor: David J. Schoon, Mendota Heights, Minn.

[73] Assignee: Schoonscan, Inc., Mendota Heights, Minn.

[21] Appl. No.: 181,573

[22] Filed: Jan. 13, 1994

[51] Int. Cl.⁶ ................................................ G02F 1/00
[52] U.S. Cl. ............................................. 359/323; 359/820
[58] Field of Search ................................ 359/288, 305, 359/307, 321, 323, 820, 349

[56] References Cited

U.S. PATENT DOCUMENTS

| | | | |
|---|---|---|---|
| 3,618,736 | 11/1971 | Abell, Jr. et al. | 197/17 |
| 3,934,698 | 1/1976 | McGourty | 197/90 |
| 4,312,004 | 1/1982 | Samek et al. | 346/1.1 |
| 4,389,655 | 6/1983 | Baues | 346/107 R |
| 4,435,064 | 3/1984 | Tsukada et al. | 355/1 |
| 4,542,392 | 9/1985 | Schulz-Hennig | 346/160 |
| 4,571,623 | 2/1986 | Schoon | 358/208 |
| 4,586,057 | 4/1986 | Schoon | 346/108 |
| 4,630,223 | 12/1986 | Schoon | 364/518 |
| 4,686,363 | 3/1987 | Schoon | 250/235 |
| 4,739,416 | 4/1988 | Manian | 358/302 |
| 4,746,942 | 5/1988 | Moulin | 354/5 |
| 4,761,057 | 8/1988 | Zak et al. | 350/273 |
| 4,867,543 | 9/1989 | Bennion et al. | 350/384 |
| 4,897,672 | 1/1990 | Horiuchi et al. | 346/107 R |
| 4,899,223 | 2/1990 | Springer et al. | 358/302 |
| 4,951,064 | 8/1990 | Kun et al. | 346/107 R |
| 4,967,240 | 10/1990 | Kitano et al. | 355/318 |
| 4,990,943 | 2/1991 | Phillips | 350/392 |
| 5,040,003 | 8/1991 | Willis | 346/157 |
| 5,054,893 | 10/1991 | Schoon | 359/254 |
| 5,130,839 | 7/1992 | Tomita | 359/205 |
| 5,164,742 | 11/1992 | Baek et al. | 346/76 |
| 5,225,851 | 7/1993 | Schoon | 346/108 |

FOREIGN PATENT DOCUMENTS

| | | |
|---|---|---|
| 189664 | 12/1985 | European Pat. Off. |
| 1128199 | 2/1958 | Germany |
| 61-107317 | 5/1986 | Japan |

Primary Examiner—Georgia Y. Epps
Assistant Examiner—Dawn-Marie Bey
Attorney, Agent, or Firm—Merchant, Gould, Smith, Edell, Welter & Schmidt

[57] ABSTRACT

An electro-optic imager, used for exposing photosensitive media, wherein a modulator, e.g. an array of PLZT light valves, is used to modulate one or more light beams. Temperature control is applied to the modulator to reduce or eliminate variations in response characteristics which would otherwise change the color balance of the final print from the desired color balance.

21 Claims, 2 Drawing Sheets

TEMPERATURE STABILIZATION MEANS FOR IMAGING OUTPUT RECORDER

FIELD OF THE INVENTION

The present invention relates to imaging devices, and more particularly to imaging devices where an image is recorded on photosensitive media by a plurality of light beams.

BACKGROUND OF THE INVENTION

Imagers, usually laser imagers, are used to record electronically produced information on photographically sensitive media (e.g. photographic film or paper; or photoconductive drums, as in laser printers). Such devices are used in applications wherein information exists in an electronic form and a visually observable presentation of the information is desired. Typically a single beam of light is directed sequentially across a photosensitive media, in a raster scan fashion. Typically a laser (e.g. a gas laser beam) is used to create the beam.

Such imagers are used to create images when a computer is used to control or create the image information. Examples of the functions which are best done with computer assistance are: (1) size adjustment and cropping; (2) combinations of same or other photos into a layout; (3) addition of text or other graphics to photos; (4) color corrections (e.g. correction for use of daylight film with incandescent lighting); (5) unsharp masking (i.e. electronic sharpening of a photograph); (6) darkness and contrast adjustments; and (7) retouching. Hardcopy images are also needed when printing plates are being prepared, and a proof of the electronic image information must be obtained prior to preparation of printing plates from that same image information. Another example of needs for electronic imagers is in the preparation of medical x-rays (e.g. from CAT [Computerized Axial Tomography] or NMR [Nuclear Magnetic Resonance] scans).

One type of output recorder uses three lasers (one red, one green, and one blue) to create a latent image on photographic paper or film. Another type uses an accusto-optic modulator to modulate a noncoherent light source. Still another type uses light valves to modulate a noncoherent light source.

The light source is sometimes deflected by a moving mirror or set of mirrors (e.g. a polygon mirror) to obtain a raster scanning action on the photosensitive media. Another design directs the modulated light towards a rotating drum which has photosensitive media wrapped around it.

Once the latent images are created, the photographic paper or film is chemically processed to obtain a visually observable image.

Most such imagers require that one or more beams of light be modulated in order to create an image. It has been found, however, that some light modulators exhibit an undesirable sensitivity to temperature. Variations in temperature of a light modulator may create variations in response which, if not corrected, may create deviations in the image produced from the desired image. Therefore, a need exists in the art for a system for stabilizing the response of imaging systems, especially the light modulators therein, to variations in temperature, so that high quality, discontinuity-free images may be formed therewith.

SUMMARY OF THE INVENTION

The present invention addresses these and other problems associated with the prior art in providing creation of a latent image on photosensitive media wherein the images formed are substantially free from discontinuities and variations due to temperature effects. The present invention provides this degree of precision in part by controlling the temperature of the modulator which is used to form the light beams which image the photosensitive media. Further, in doing so, a preferred embodiment of the invention may also lengthen the useful lifetime of the modulator by protecting it from the outside environment. The invention also provides these above-identified properties with a comparatively low cost of manufacturing, not requiring expensive machining of mechanical components or expensive electronic controls.

In accordance with one aspect of the invention, there is provided a temperature stabilization apparatus for reducing response variations of a light modulating device of the type optically disposed in an imaging system between a light source and a photosensitive media. The temperature stabilization apparatus includes temperature sensing means for sensing the temperature of a modulating device and providing a temperature signal representative thereof, a cooling means for cooling the modulating device, and a control means for actuating the cooling means responsive to the temperature signal to maintain the modulating device at a substantially constant temperature.

In accordance with another aspect of the invention, there is provided an imaging apparatus for applying at least one light beam to a photosensitive media. In addition to the aforementioned temperature stabilization apparatus, the imaging apparatus includes a light source and a modulating means for modulating light from the light source and outputting at least one light beam.

In accordance with a further aspect of the invention, there is provided a method for reducing response variations of a light modulating device of the type optically disposed in an imaging system between a light source and a photosensitive media. The steps of this method include sensing the temperature of a modulating device and providing a temperature signal representative thereof, and, in response to that signal, selectively cooling the modulating device to maintain the modulating device at a substantially constant temperature.

In a preferred embodiment, the invention is used in an imaging system in which a plurality of light beams are used for imaging (e.g. 20–200 beams). These light beams are modulated by an array of Plumbus Lanthanum Zirconium Titanate (PLZT) light valves, which generally exhibit an undesirable sensitivity to temperature. In a preferred embodiment, the temperature of PLZT light valves is sensed by both (1) a thermistor, and (2) variations in the ratio of intensities seen at each of two voltages presented to the light valves. Heating of the light valves occurs by virtue of the lamp used for illumination. Cooling of the light valves occurs by controlling the voltage to a fan directed towards these light valves. Also, in a preferred embodiment, increased thermal mass of the light valves may be obtained by attaching, in thermal contact to the light valves, a glass plate. The glass plate thus attached isolates the PLZT electrodes from air, thus lengthening their useful lifetime.

These and other advantages and features, which characterize the invention are pointed out with particularity in the claims annexed hereto and forming a part hereof. However, for a better understanding of the invention, its advantages and objectives attained by its use, reference should be made to the drawing which forms a further part hereof and to the accompanying descriptive matter, in which there is described a preferred embodiment of the invention.

DETAILED DESCRIPTION OF THE PREFERRED EMBODIMENTS

My issued U.S. patents U.S. Pat. Nos. 5,054,893 and 5,225,851, and co-pending applications Ser. No. 07/827,061 and Ser. No. 07/884,408 (filed on Jan. 28, 1992 and May 19, 1992, respectively), discuss various methods of imaging with multiple parallel beams of light. To the extent they are required to support this disclosure, the disclosures of these references are incorporated by reference herein. In summary, according to these patents and applications, a plurality (e.g., 64) of light beams are generated using lanthanum-modified lead zirconate titanate (PLZT) electro-optic light modulators to control more or less collimated light. By writing to a photosensitive media with multiple beams, a high overall speed (square inches of image generated per second) is obtained even with a small relative speed between any beam and the media. Because this speed is small the images can be created in bands, with the imaging system alternating between (1) imaging a band (e.g., 0.2" wide), with no movement of the optical system in the cross-scan direction, and (2) movement of the optical system in the cross-scan direction, with no imaging occurring. Such a system is the preferred environment for use of the present invention; however, one skilled in the art will appreciate that the principles of the invention may be employed in alternate types of modulators, scanners, and imaging systems to that disclosed herein.

Figure 1:
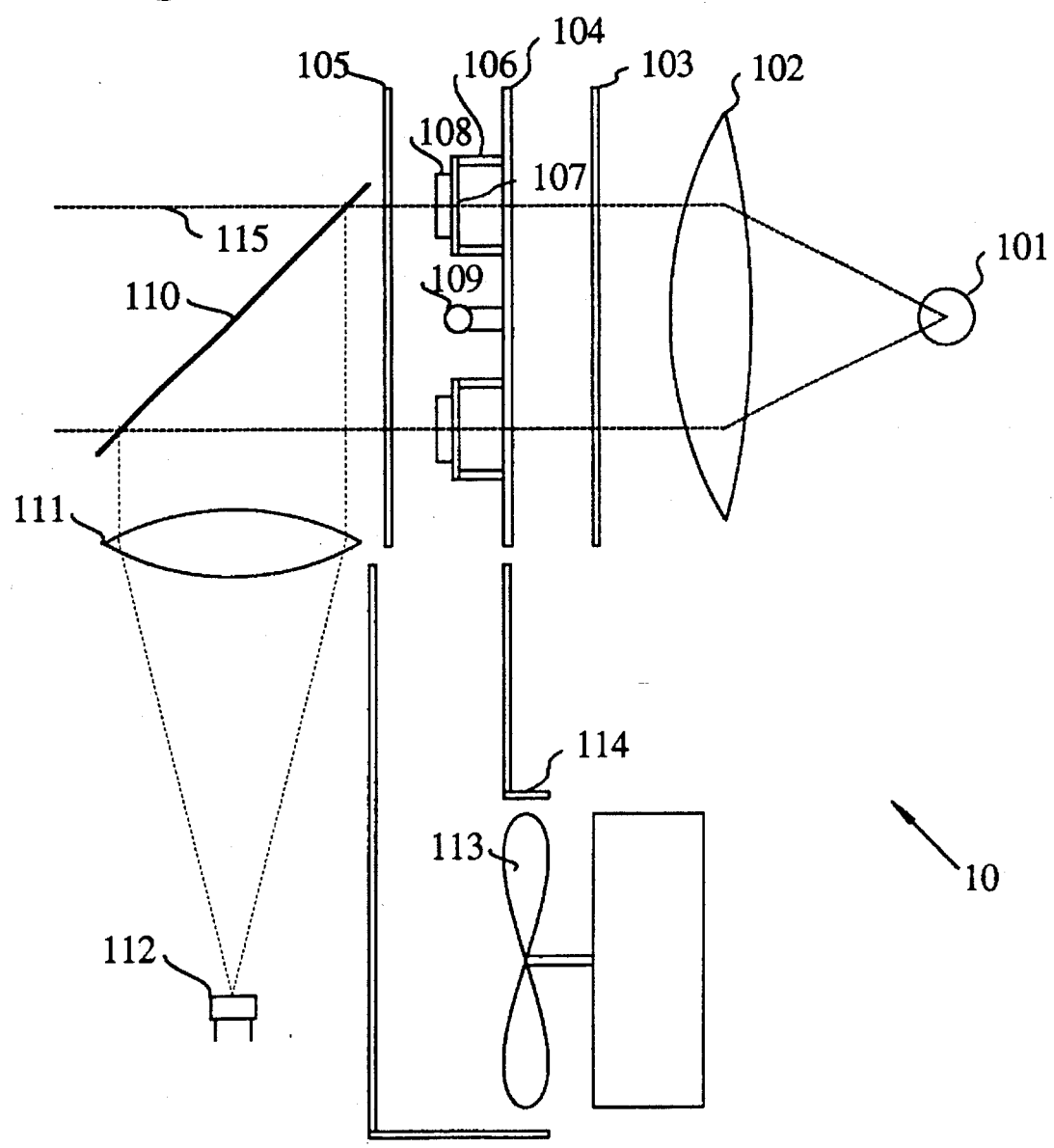
FIG. 1 is a plan view of a temperature stabilization apparatus consistent with the present invention.

Turning to the figures, wherein like numbers denote like parts throughout the several views, FIG. 1 shows the primary elements of the preferred temperature stabilization system for use in imaging system 10. In imaging system 10, light is produced by lamp 101, which preferably is a short arc xenon lamp (e.g., Optical Radiation Corporation XM150-1HS, 150-watt). Lens 102 produces more or less collimation of this light. It is polarized by polarizer 103. Printed circuit board 104 holds components including integrated circuit pins 106 and a light modulator device, PLZT chip 107. This chip has electrodes on its surface in a fingerlike fashion, as is described in my U.S. Pat. No. 5,054,893. The PLZT material itself is Motorola Semiconductor, Ceramic Products Division, type #9065. Application of a voltage between any one electrode and a common electrode cause localized stress within the PLZT chip and rotation of the vector of the polarized light. A second polarizer 105 acts to allow only light through it which has a rotated vector of polarization, in an amount which is dependent on the amount of rotation of this vector.

The rays of light in the system are indicated by dashed lines, e.g., line 115. To the left of polarizer 105, in the direction of line 115, would be optical deflection means. This could a polygon mirror system or an external drum system. Thus described, the modulator device (PLZT chip 107) is optically disposed between the light source and the photosensitive media, i.e., the rays of light along line 115 pass through PLZT chip 107.

In the preferred temperature stabilization system, a beamsplitter 110 deflects some of the light passing through polarizer 105 to lens 111 and photodiode 112. Beamsplitter 110 is preferably a glass plate which passes at least 80% of the light reaching it, and reflects less than 20% of this light, leaving considerable illumination for imaging. Photodiode 112 does not require intense illumination to operate properly.

Lens 111 is adjusted so that an image of lamp 101 is obtained on photodiode 112.

On circuit board 104, thermistor 109 senses the general temperature in the region of the one or more light valve arrays 106.

Further, in the preferred embodiment, glass plates 108 are attached onto one or more of the light valve (PLZT) chips 107. The electrodes of the light valve chips are on the side of the chip where the glass plate is attached. If the light valve chips have electrodes on both sides, then preferably glass plates are attached on both sides. The method of attachment is to use a flexible, preferably UV-curing epoxy with about 0.5 mm epoxy thickness between the two pieces. Use of this much thickness permits greater flexure of the PLZT chips when voltages are applied to the various electrodes.

The PLZT chips 107 are heated by lamp 101. They are cooled by fan 113, with air deflectors 114.

Figure 2:
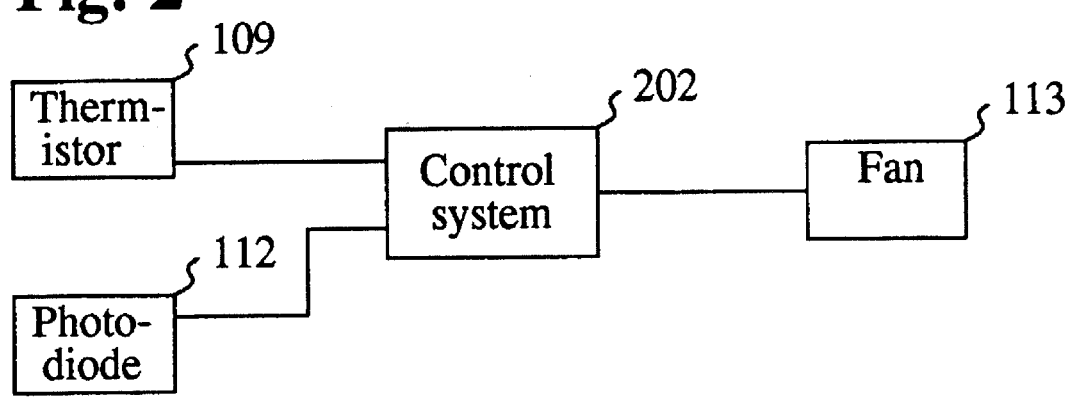
FIG. 2 is a block diagram of the control system used in the temperature stabilization apparatus of FIG. 1.

FIG. 2 shows in block diagram form a control system used in the preferred embodiment. Control system 202 senses inputs from thermistor 109 and photodiode 112, and regulates the voltage to fan 113. This control system is also connected to other parts of the overall imaging system, including the portion which controls the voltages to the electrodes of the PLZT chips.

The imaging is preferably controlled so as to have a portion of time periodically when no imaging onto photographic media is occurring. During a portion of that time, the control system places a first voltage on the light valve electrodes, typically 50% of the maximum voltage used, and senses the light received at photodiode 112. This being done, this is repeated with a second voltage, typically 100% of the maximum voltage used. As the temperature changes, the amount of rotation of the polarization vector obtained per volt changes. For example, suppose at temperature $t_1$ application of 150 v produces rotation of 45 deg, and 300 v produces rotation of 90 deg. The light passing through the system in each case is proportional to the sine of the angle, so the ratio of the two light intensities is sin(45)/sin(90)= 0.707.

At a higher temperature, more rotation per volt occurs. Suppose at temperature $t_2$ (where $t_2>t_1$), application of 150 v produces 50 deg rotation, and application of 300 v produces 100 deg. The light passing through the system is sin(50)/sin(100)=0.778.

For temperature control, the following items are preferably present in the preferred temperature stabilization system: (1) a method of heating; (2) a method of cooling; (3) a method of sensing the current temperature, and (4) a method of reducing the thermal sensitivity of the PLZT chips and making certain that the rate of change of temperature is slow compared to the rate at which corrections can be applied. Each of these is described further below:

1. The method of heating is the application of light energy to the PLZT chips and surrounding elements by lamp 101.

2. The method of cooling is the variable application of relatively cool air to the environment of the PLZT chips, preferably via fan 113. Control system 202 preferably provides variable voltages to the fan to allow for greater or smaller amounts of air, depending on the extent of thermal error. Alternatively, a single speed fan may be turned on or off to correct for thermal error.

3. The method of sensing the current temperature is to observe (1) thermistor 109, and (2) the ratio of output voltages obtained from photodiode 112 under different electrode voltage conditions. The two methods of measurement are preferably used to maximize the signal to noise ratio of the measurement, thus providing for the most precise possible temperature control. Because of the alternate imaging (and thus not self-calibrating) and non-imaging (and thus potentially self-calibrating) behavior of the overall device, photodiode 112 can provide information only at the end of scan lines and during "dead cycles" during which mechanical realignment occurs. Thus the photodiode information is intermittent in nature. The thermistor has a longer thermal lag time than the PLZT chips, and senses only one point in the system. Each sensor has its limitations. The microprocessor control system, 202, is programmed so that when both types of information are available, the average of temperatures based on the photodiode (112) and on the thermistor (109) is used. When the photodiode is no longer available (because imaging is being accomplished), the thermistor's output is averaged with the last available photodiode output. In this way, the least noise in the data is desirably obtained.

4. Finally, the glass plates (108) provide thermal mass so that the rate of change of temperature is slow, so that little variation in temperature can occur before the fan, 113, corrects for that change.

No imaging is usually permitted in the system until the PLZT chips warm up to an operating temperature. If no imaging has been performed for a long period of time, this may take 1–2 minutes; if imaging has generally been occurring, no significant time delay is needed.

With this type of control system, the temperature of the PLZT chips 107 is held substantially constant, so no significant variation in the information sent to these chips for thermal drift needs to occur.

It is also known that over a long period of time, when light valves such as PLZT chips 107 are in contact with air some degradation of the material in the light valves may occur. Insulation of the material from air prevents this degradation. Therefore, the glass plates 108, besides providing a thermal mass, provide this insulation. This process is generally termed "passivation".

Note that in the preferred embodiment the polarizers (103 and 105) are spaced some distance away (e.g., 0.25" or more) from the PLZT chips 107. Each generates some heat, and these items are preferably separate from the PLZT chips 107. Alternatively, the polarizers and PLZT chips may be formed as one integral unit to reduce surfaces which could cause light reflection; however, I believe that having one or both polarizers integral to the PLZT chip would likely reduce performance from a thermal standpoint.

Other embodiments are possible within the scope of the invention. Sensing of light transmission at just a single voltage could be done, though the information obtained would not be as independent of possible variations in lamp intensity as that obtained at two voltages. More than one thermistor could be used. In addition, either the thermistor 109 or the photodiode 112 may be used as the sole temperature sensor. A thermoelectric cooler may also be used in place of a fan, and a heating means such as a resistor separate from the light source may be implemented to decrease warm-up time and allow for faster response. Further, the glass plates 108 used for thermal mass could be varying dimensions, materials, and masses to modify the thermal response of the light valves. They also may be omitted in some applications when the thermal response is not as critical.

Further, the invention may be used to control the response of other modulators beside PLZT valves, and may also be used in other types of imaging systems.

The above discussion, examples and embodiments illustrate my current understanding of the invention. However, one skilled in the art will appreciate that various additional changes may be made without departing from the spirit and scope of the invention. Thus, the invention resides wholly in the claims hereafter appended.

I claim:

1. An imaging apparatus for applying at least one light beam to a photosensitive media comprising:
    (a) a light source for providing light for use in imaging the photosensitive media;
    (b) modulating means for modulating light from the light source and outputting the light beam; and
    (c) temperature stabilization means for reducing response variations of the modulating means including:
        (i) temperature sensing means for sensing the temperature of the modulating means and providing an output signal representative thereof, the temperature sensing means including a photosensor operatively configured to receive light output from the modulating means; whereby the output signal is representative of the intensity of light output from the modulating means;
        (ii) cooling means for cooling the modulating means; and
        (iii) control means for actuating the cooling means responsive to a temperature signal to maintain the modulating means at a substantially constant temperature, the control means including means for actuating the modulating means to output the light beam at two intensity levels, and means for generating the temperature signal, wherein the temperature signal is representative of the ratio of the output signals of the photosensor at the two intensity levels of the light beam.

2. The imaging apparatus of claim 1, wherein the modulating means comprises an array of PLZT light valves.

3. The imaging apparatus of claim 1, wherein the temperature sensing means further comprises a beamsplitter for deflecting a portion of the light beam toward the photosensor.

4. The imaging apparatus of claim 1, wherein the temperature sensing means further comprises a thermistor operatively disposed to sense the temperature proximate the modulating means and provide an output signal representative thereof, and wherein the means for generating the temperature signal takes the average of the output signal from the thermistor and the ratio of the output signals of the photosensor at the two intensity levels of the light beam.

5. The imaging apparatus of claim 1, wherein the cooling means comprises a fan, and wherein the control means actuates the fan responsive to the temperature signal.

6. The imaging apparatus of claim 5, wherein the fan is a variable speed fan, and wherein the control means actuates the fan at a plurality of speeds.

7. The imaging apparatus of claim 1, wherein the temperature stabilization means further comprises sensitivity reduction means, operatively connected to the modulating means, for increasing the thermal mass and reducing the thermal sensitivity of the modulating means.

8. The imaging apparatus of claim 7, wherein the temperature stabilization means further comprises passivation means for insulating the modulating means.

9. The imaging apparatus of claim 8, wherein the sensitivity reducing means and the passivation means comprise at least one glass plate disposed over at least one surface of the modulating means.

10. The imaging apparatus of claim 1, wherein the control means actuates the modulating means to output the light beam at 50% and 100% intensity levels.

11. A temperature stabilization apparatus for reducing response variations of a light modulating device of the type optically disposed in an imaging system between a light source and a photosensitive media, the apparatus comprising:

(a) temperature sensing means for sensing the temperature of a modulating device and providing an output signal representative thereof, the temperature sensing means including a photosensor operatively configured to receive light output from the modulating device; whereby the output signal is representative of the intensity of light output from the modulating device;

(b) cooling means for cooling the modulating device; and (c) control means for actuating the cooling means responsive to a temperature signal to maintain the modulating device at a substantially constant temperature, the control means including means for actuating the modulating device to output light at two intensity levels, and means for generating the temperature signal, wherein the temperature signal is representative of the ratio of the output signals of the photosensor at the two intensity levels.

12. The temperature stabilization apparatus of claim 11, wherein the modulating device comprises an array of PLZT light valves.

13. The temperature stabilization apparatus of claim 11, wherein the temperature sensing means further comprises a thermistor operatively disposed to sense the temperature proximate the modulating device and provide an output signal representative thereof, and wherein the means for generating the temperature signal takes the average of the output signal from the thermistor and the ratio of the output signals of the photosensor at the two intensity levels.

14. The temperature stabilization apparatus of claim 11, wherein the temperature stabilization means further comprises sensitivity reduction means, operatively connected to the modulating device, for increasing the thermal mass of the modulating device.

15. The temperature stabilization apparatus of claim 11, wherein the control means actuates the modulating device to output light at 50% and 100% intensity levels.

16. The temperature stabilization apparatus of claim 11, further comprising:

(a) a beamsplitter, operatively disposed between the modulating device and the photosensitive media, for deflecting a portion of the light output from the modulating device toward the photosensor; and (b) a glass plate, disposed over at least one surface of the modulating device, for insulating and reducing the thermal sensitivity of the modulating device.

17. The temperature stabilization apparatus of claim 11, wherein the cooling means comprises a fan.

18. A method for reducing response variations of a light modulating device of the type optically disposed in an imaging system between a light source and a photosensitive media, the method comprising the steps of:

(a) activating the modulating device to output light at two intensity levels;

(a) sensing the intensities of the light output from the modulating device at the two intensity levels and providing output signals representative thereof; and (b) selectively cooling the modulating device to maintain the modulating device at a substantially constant temperature in response to a temperature signal which is representative of the ratio of the output signals at the two intensity levels.

19. The method of claim 18, further comprising the step of sensing temperature with a thermistor disposed proximate the modulating device and providing an output signal representative thereof, wherein the step of sensing the intensities of the light output from the modulating device is performed using a photosensor operatively configured to receive light output from the modulating device, and wherein the temperature signal is representative of the average of the output signal of the thermistor and the ratio of the output signals of the photosensor at the two intensity levels.

20. The method of claim 18, wherein the activating step activates the modulating device to output light at 50% and 100% intensity levels.

21. The method of claim 18, wherein the modulating device comprises an array of PLZT light valves.

* * * * *